No. 618,652. Patented Jan. 31, 1899.
J. ENGEL.
BICYCLE.
(Application filed Mar. 18, 1898.)
(No Model.)
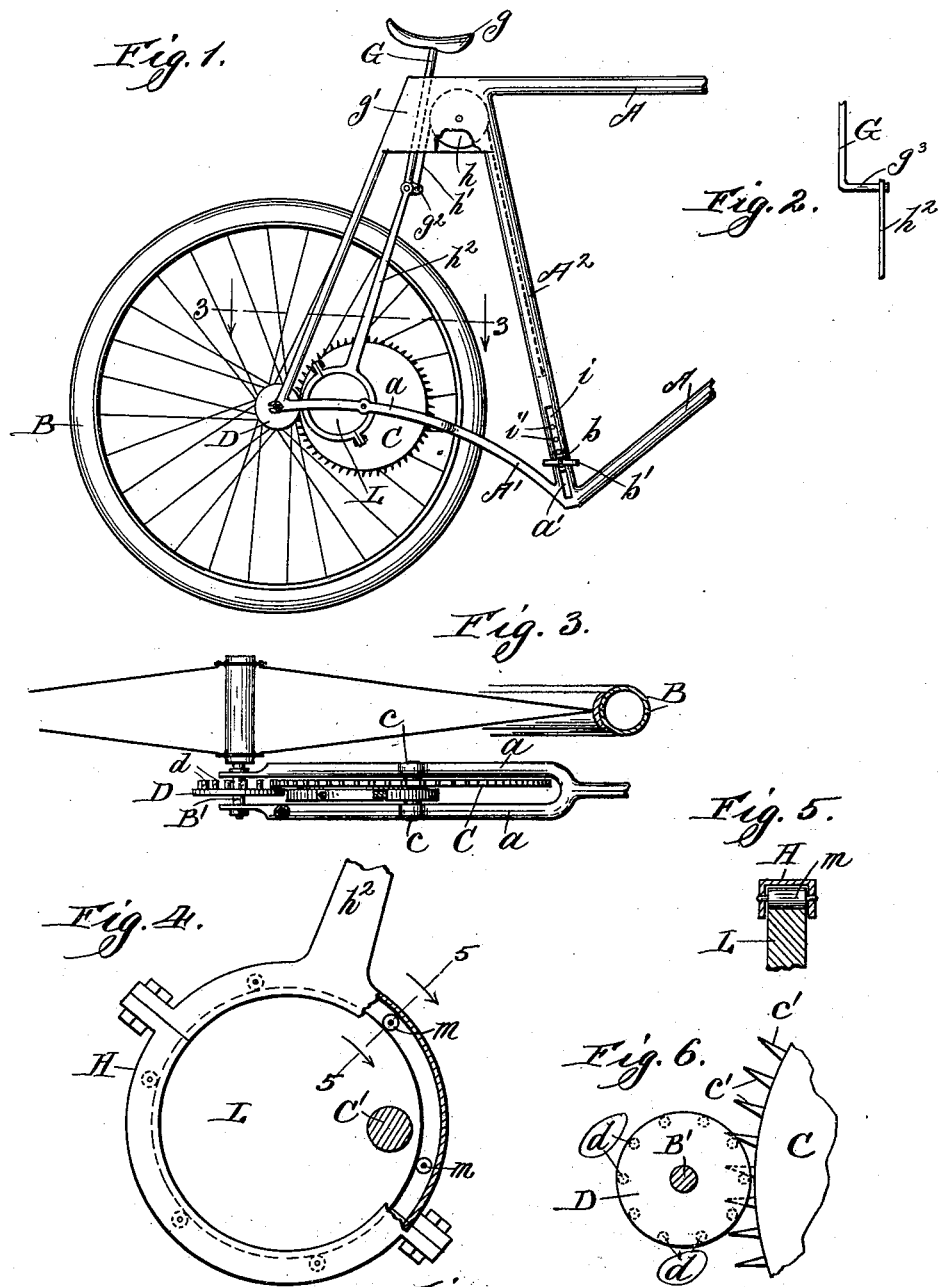

UNITED STATES PATENT OFFICE.

JOHN ENGEL, OF CHICAGO, ILLINOIS, ASSIGNOR OF TWO-THIRDS TO HINRICH ENGEL AND CHRISTOPHER ENGEL, OF SAME PLACE.

BICYCLE.

SPECIFICATION forming part of Letters Patent No. 618,652, dated January 31, 1899.

Application filed March 18, 1898. Serial No. 674,299. (No model.)

*To all whom it may concern:*

Be it known that I, JOHN ENGEL, a citizen of the United States, residing at Chicago, in the county of Cook and State of Illinois, have invented certain new and useful Improvements in Bicycles, of which the following is a specification.

This invention relates to improvements in the driving mechanism to be used for propelling bicycles and velocipedes; and it consists in certain details of construction shown in the drawings and as will be hereinafter more fully set forth and specifically claimed.

The principal object of my invention is to provide a driving mechanism whereby the weight of the rider may be utilized in the propulsion of the vehicle.

Other objects and advantages of my improvement will appear in the description hereinafter contained.

In order to enable others skilled in the art to which my invention pertains to make and use the same, I will now proceed to describe it, referring to the accompanying drawings, in which—

Figure 1 is a view in side elevation of the rear wheel of a bicycle and rear portion of the frame, showing my driving mechanism in position thereon. Fig. 2 is a detail view of a portion of the saddle-post and a part of the rod connecting it with an eccentric on the driving-gear. Fig. 3 is a plan view, partly in section and partly in elevation, taken on line 3 3 of Fig. 1, showing a part of the rear wheel, a portion of the lower rear fork of the frame, the prongs at one side, and the gears mounted therein. Fig. 4 is a view in side elevation of the eccentric wheel and its band or ring. Fig. 5 is a sectional view taken on line 5 5 of Fig. 4, showing a portion of the eccentric wheel and the form of the eccentric band or ring, with one of the antifriction-rollers journaled in its sides. Fig. 6 is a view in elevation of a portion of the driving-gear, showing it engaging the rollers of the disk located on the axle of the rear wheel of the bicycle; and Fig. 7 is a plan view of the driving-wheel, showing a modification in its construction.

The front part of the bicycle-frame has been omitted from the drawings and may be of the ordinary or any preferred construction, while the rear portion of the frame A differs somewhat from the ordinary or general construction in that the lower rear fork A' is forwardly curved to some distance below a horizontal line drawn through the axles of the wheels and is formed or provided on one side of the rear wheel B with prongs $a$, in the ends of which the axle B' of the rear wheel has its bearings and at a suitable point in front of said axle have bearings $c$ for the driving-gear C, which has on its periphery a series of teeth $c'$ to engage the projecting pins or antifriction-rollers $d$ on the disk D, which latter is fixed to the shaft of the rear wheel of the bicycle. Extending from the front part of the lower rear fork A' to the upper portion of the frame A is a tube $A^2$, which is provided in its lower portion with a longitudinal slot $a'$ for the operation of the transverse bar $b$, on which the pedals $b'$ are mounted. The upper part of the frame A just beneath the saddle $g$ is provided with a casing $g'$, in which is journaled a grooved pulley $h$, over which passes a cable or chain $h'$, one end of which is secured to a reciprocating block $i$, located in the lower portion of the tube $A^2$, which block is provided with a number of openings $i'$ to receive the independent transverse bar $b$ of the pedals, so that said bar and pedals may be adjusted to the proper point for the convenience of the rider. The other end of the cable or chain $h'$ is secured to an arm or projection $g^2$ of the saddle-post G, which has a vertical movement through the casing $g'$ on the rear upper part of the bicycle-frame. The lower portion of the saddle-post G is provided with a lateral arm $g^3$, to which is pivotally secured the rod $h^2$, which is connected at its other end to the band or ring H, surrounding the eccentric wheel L, which is located on or may be made integral with the driving-gear C, to whose axle C' it is eccentric. The ring or band H, which fits and operates on the eccentric L, is substantially U-shaped in cross-section, as shown in Fig. 5 of the drawings, and has journaled in its sides at suitable points a number of antifriction-rollers $m$, with which the periphery of the eccentric wheel will impinge. The driving-gear C is provided on its periphery with teeth $c'$, whose lower surfaces are inclined, as shown in Fig. 6 of the drawings, so when they impinge the rollers $d$ on the disk D one of said rollers will travel on the inclined portion of one of the teeth $c'$ toward the periphery of the driving-gear until the upper adjacent tooth strikes the upper adjacent roller and thus continue.

In Fig. 7 of the drawings I have shown a modification in the construction of the driving-gear C, which instead of being provided with an eccentric disk, as above described, has secured to its outer surface one end of a crank-shaft N, whose other end is turned at a right angle to form an arm $n$, substituting a portion of the journal of the driving-gear. To that portion of the shaft N secured to the driving-gear is pivotally secured the rod $h^2$, which is connected at its upper end to the saddle-post, as above described.

From the foregoing and by reference to the drawings it will be seen and readily understood that the weight of the rider on the saddle will force the saddle-post downward, when by reason of its connection through the rod $h^2$ with the eccentric L on the driving-gear said gear will be rotated in the direction indicated by the arrow in Fig. 1 of the drawings, which operation will move the wheel B in the direction of the arrow indicating its movement. When the parts have thus been set in motion, the pedal-bar $b$ and its pedals $b'$ will be raised in the slot $a'$ of the tube $A^2$ by means of the cable or chain $h'$, which is attached to the lower portion of the saddle-post, when by placing the weight of the rider on the pedals it is apparent that the driving-gear will continue its rotation and the propulsion of the bicycle. It is also apparent that I may substitute the construction shown in Fig. 7 of the drawings instead of the eccentric wheel on the driving-gear and attain the same results.

Having thus fully described my invention, what I claim as new, and desire to secure by Letters Patent, is—

The combination with a safety-bicycle frame having its rear fork provided with two prongs on one side, both ends of which embrace the rear axle; of a disk fixed on said axle between the prongs and having a series of projecting rollers, a driving-gear journaled between said prongs and with teeth beveled on the face which engages said rollers, an eccentric on the shaft of this gear, a reciprocating saddle-post, connections between the latter and the eccentric, a reciprocating pedal-bar, and connections between the latter and the saddle-post for operating the gearing, substantially as described.

Chicago, Illinois, March 15, 1898.

JOHN ENGEL.

Witnesses:
   CHAS. C. TILLMAN,
   HENRY ENGEL.